US011093875B2

(12) United States Patent
Hancock et al.

(10) Patent No.: US 11,093,875 B2
(45) Date of Patent: Aug. 17, 2021

(54) SYSTEM AND METHOD FOR DETERMINING COMPETENCY DEFICIENCIES AND MATCHING BETWEEN PARTICULAR PROJECTS AND AVAILABLE WORKERS OR CANDIDATES

(71) Applicant: 4D Technologies, LLC, Bedford, NH (US)

(72) Inventors: James Hancock, West Chesterfield, NH (US); Jared Germano, Nashua, NH (US); David Micciche, Manchester, NH (US); Matthew Murphy, New Durham, NH (US); Daniel Dolan, Bedford, NH (US)

(73) Assignee: 4D Technologies, LLC, Bedford, NH (US)

( * ) Notice: Subject to any disclaimer, the term of this patent is extended or adjusted under 35 U.S.C. 154(b) by 268 days.

(21) Appl. No.: 16/117,078

(22) Filed: Aug. 30, 2018

(65) Prior Publication Data

US 2019/0066029 A1    Feb. 28, 2019

Related U.S. Application Data

(60) Provisional application No. 62/551,912, filed on Aug. 30, 2017, provisional application No. 62/551,919, (Continued)

(51) Int. Cl.
*G06Q 10/06* (2012.01)
*G06N 5/04* (2006.01)
*G06Q 50/20* (2012.01)

(52) U.S. Cl.
CPC ....... *G06Q 10/063118* (2013.01); *G06N 5/04* (2013.01); *G06Q 10/063112* (2013.01); *G06Q 50/2057* (2013.01); *G06Q 10/06313* (2013.01)

(58) Field of Classification Search
USPC ....................................................... 705/7.14
See application file for complete search history.

(56) References Cited

U.S. PATENT DOCUMENTS 6,895,382 B1 *   5/2005 Srinivasan ..... G06Q 10/063118
                                              705/7.17
8,031,913 B1 *  10/2011 Case ...................... G06Q 10/10
                                                   382/116

(Continued)

*Primary Examiner* — Folashade Anderson
(74) *Attorney, Agent, or Firm* — Ascentage Patent Law, LLC; Travis Lee Johnson

(57) ABSTRACT

A project analysis and recommendation system having a user interface configured to receive user input regarding a project and various project parameters; one or more sets of computer instructions, a user skill database, and a candidate skill database; and a processor configured to implement the one or more sets of computer instructions from the non-transitory computer readable medium. The processor configured to perform the following tasks: analyze the user skill database; determine a match between the plurality of necessary competencies and one or more user profiles; analyze the candidate skill database; determine a match between the plurality of necessary competencies and one or more potential candidate profiles; and generate a user recommendation relating to an internal assignment of the project, user training, an external assignment of the project, or an external candidate hire.

22 Claims, 6 Drawing Sheets

Related U.S. Application Data filed on Aug. 30, 2017, provisional application No. 62/551,929, filed on Aug. 30, 2017.

(56) References Cited

U.S. PATENT DOCUMENTS

| | | | |
|---|---|---|---|
| 8,265,976 B2* | 9/2012 | Fitterer | G06Q 10/1053 705/7.14 |
| 8,595,044 B2* | 11/2013 | Bernardini | G06Q 10/06 705/7.14 |
| 2008/0086366 A1* | 4/2008 | Concordia | G06Q 10/06 434/219 |
| 2009/0281865 A1* | 11/2009 | Stoitsev | G06Q 10/06312 705/7.22 |
| 2012/0226617 A1* | 9/2012 | Kay | G06Q 10/105 705/301 |
| 2014/0122143 A1* | 5/2014 | Fletcher | G06Q 10/0631 705/7.14 |
| 2016/0026963 A1* | 1/2016 | Rathod | G06Q 10/063112 705/7.14 |
| 2017/0011325 A1* | 1/2017 | Hanna | G06Q 10/063112 |
| 2017/0068922 A1* | 3/2017 | Singh | G06Q 10/063112 |
| 2017/0154307 A1* | 6/2017 | Maurya | H04L 67/306 |
| 2017/0357945 A1* | 12/2017 | Ashkenazi | G06Q 10/0631 |
| 2019/0303821 A1* | 10/2019 | Khomich | G06Q 10/0639 |
| 2020/0034441 A1* | 1/2020 | Hewitt | G06F 16/9535 |
| 2020/0394592 A1* | 12/2020 | Shi | G06N 20/00 |

\* cited by examiner

SYSTEM AND METHOD FOR DETERMINING COMPETENCY DEFICIENCIES AND MATCHING BETWEEN PARTICULAR PROJECTS AND AVAILABLE WORKERS OR CANDIDATES

PRIORITY CLAIM

This patent application claims priority to U.S. Provisional Application No. 62/551,912 which was filed on Aug. 30, 2017; U.S. Provisional Application 62/551,919 which was filed on Aug. 30, 2017; U.S. Provisional Application 62/551,929 which was filed on Aug. 30, 2017; and are all hereby incorporated by reference in their entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

1. Field of the Invention

The disclosure relates to methods and systems for determining particular needs for a project, assigning projects to employees, or filling a gap in staff skills through outside hiring or internal training. In particular the projects contemplated herein relate to complex design or modeling software and the matching of those projects based on demonstrated proficiency of particular software by users as well as matching projects to those user's being most proficient in the skills needed for that particular project whether internally or externally.

2. Description of the Prior Art

In the workplace, and particularly in the engineering design, drafting, and modeling industry, new design projects are typically received by sales representatives and transferred to individual design units which specialize in the type of design or type of product being designed. Individual software users are then assigned to complete the design task, which is typically based on that individual's docket. Any particular knowledge of a particular user's expertise is typically only considered as part of a supervisor's or assigning person's individual knowledge regarding various employee skillsets. This often leads to assignment of projects based on personal preference of the assigning person, and is often overshadowed by the particular user's docket demands and which user can start working soonest rather than assigning a project to a particular user who will be most efficient in completing the particular tasks. Therefore, a need exists to create a more accurate and objective system to address these and other concerns.

SUMMARY OF THE INVENTION

In order to improve project output quality as well as improve project efficiency, a project analysis and recommendation system is contemplated herein which can include a user interface configured to receive user input regarding a project; a non-transitory computer readable medium containing one or more sets of computer instructions, a user skill database containing a plurality of user profiles having associated tracked user skill proficiency data, and a candidate skill database containing a plurality of candidate profiles having associated candidate skill proficiency data; and a processor configured to implement the one or more sets of computer instructions from the non-transitory computer readable medium.

Various aspects of the present invention are embodied herein by a project analysis and recommendation system as well as associated methods which can include a user interface, wherein the user interface can be configured to receive user input regarding one or more project parameters related to a project, the one or more project parameters including at least information regarding one or more necessary competencies for project completion. The system also includes a non-transitory computer-readable medium containing one or more sets of computer instructions, a worker skill database containing a plurality of worker profiles having associated tracked worker skill proficiency data, and a project parameter database. The system then also includes a processor configured to implement the one or more sets of computer instructions from the non-transitory computer-readable medium. In this embodiment the computer instructions then contain instructions for the processor to perform a plurality of tasks, the plurality of tasks including: analyze the worker skill database; determine one or more weighted worker match scores comparing the one or more necessary competencies for project completion and one or more worker profiles having matched tracked worker skill proficiency data; and determine one or more deficiencies of one or more workers between associated worker skill proficiencies and the one or more necessary competencies.

In some embodiments the user interface can be configured to receive user input regarding one or more available tools necessary for project completion. In some such embodiments the non-transitory computer-readable medium can then store a candidate skill database containing a plurality of candidate profiles having associated candidate skill proficiency data. Then, in this embodiment, the computer instructions can include instructions for the processor to perform the following tasks: analyze the candidate skill database having a plurality of candidate profiles, wherein each candidate profile contains information regarding various candidate skill proficiencies associated with one or more specific candidate skills; determine a weighted candidate match score comparing the plurality of necessary competencies and one or more potential candidate profiles having one or more specific candidate skills associated with the one or more available tools required for project completion; and determine one or more deficiencies of one or more candidates between associated candidate skill proficiencies and the one or more necessary competencies. Further, in some instances of this embodiment, the system can then instruct the processor to generate an external candidate hire recommendation when the weighted worker match score drops below a predefined threshold value.

In yet additional alternative embodiments, the non-transitory computer-readable medium can include a training database and the computer instructions can also include instructions for the processor to instruct the processor to generate a training recommendation suited to increase the weighted worker match score when the weighted worker match score drops below a predefined threshold value.

In yet additional alternative embodiments, the computer instructions can also include instructions for the processor to track one or more worker's interactions with the one or more available tools and update the tracked worker skill proficiency data associated with an associated specific worker skill within the worker skill database based on the associated worker's interactions with the one or more available tools.

In yet additional alternative embodiments, the computer instructions can also include instructions for the processor to track a training history associated with a plurality of workers with regard to the one or more available tools; and update each worker's profile and an associated specific tracked worker skill proficiency data based on the associated worker's associated training history with each associated available tool.

In yet additional alternative embodiments, the computer instructions can also include instructions for the processor to, track a plurality of historical actions relating one or more previously completed workflows associated with one or more workers and one or more associated necessary competencies for project completion; and update each worker's profile and an associated specific tracked worker skill proficiency data based on the associated worker's associated one or more previously completed workflows.

In yet additional alternative embodiments, the non-transitory computer-readable medium can include store a proficiency assessment database on the non-transitory computer-readable medium, wherein the proficiency assessment database contains one or more proficiency assessments, the one or more proficiency assessments relating to the various worker skill proficiencies associated with one or more specific worker skills. The computer instructions can then also include instructions for the processor to present a proficiency assessment to at least one worker; track performance data for the worker on the proficiency assessment; and update each worker's profile and an associated specific tracked worker skill proficiency data based on the associated worker's performance on the proficiency assessment.

In some embodiments ad described above the weighted worker match score and the weighted candidate match score can be generated giving a first greater weight to tracked worker skill proficiency data or candidate skill proficiency data on the performance assessments, a second lesser weight to historical actions regarding one or more previously completed workflows, and a third lesser weight to worker training history.

In yet additional alternative embodiments the computer instructions contain instructions for the processor to receive a candidate description file and determine matches between keywords from the description and auto populate an associated candidate profile and a plurality of specific candidate skills associated with each profile.

In yet additional alternative embodiments, the computer instructions can also include instructions for the processor to determine one or more devoid worker proficiencies for each worker profile representing a differential between one or more skills required for project completion and the tracked worker skill proficiency data; generate a customized worker proficiency assessment representing the one or more devoid worker proficiencies; present the customized proficiency assessment to an associated worker; track the worker's performance on the customized worker proficiency assessment; adjust the tracked worker skill proficiency data within the associated worker's worker profile based on the worker's performance on the customized worker proficiency assessment; update the weighted worker match score; and update the worker recommendation.

In yet additional alternative embodiments, the computer instructions can also include instructions for the processor to determine one or more devoid candidate proficiencies for each candidate profile representing a differential between one or more skills required for project completion and the candidate skill proficiency data; generate a customized candidate proficiency assessment representing the one or more devoid candidate proficiencies; present the customized proficiency assessment to an associated candidate; track the candidate's performance on the customized candidate proficiency assessment; adjust the candidate skill proficiency data within the associated candidate's candidate profile based on the candidate's performance on the candidate proficiency assessment; update the weighted candidate match score; and update the candidate recommendation.

In some such embodiments, a completion procedure can involve various commands and actions which can be tracked by the processor in real time for each customized worker assessment and each customized candidate assessment, wherein the completion procedure utilized by the worker or candidate is compared to a determined optimal completion procedure. In such embodiments a worker assessment completion procedure can then be compared to the optimal completion procedure with respect to deviations from particular sequential steps and total time required to complete.

In some such embodiments a completion procedure involving various commands and actions can be tracked by the processor by means of sensor input and worker input or candidate input received during the assessment.

In yet additional alternative embodiments, the computer instructions can also include instructions for the processor to generate and present customized training content based on deficiencies determined from the customized worker proficiency assessment and the customized candidate proficiency assessment.

In some such embodiments, a plurality of customized candidate proficiency assessments representing the one or more associated devoid candidate proficiencies can be transmitted over a network for completion by a plurality of associated candidates.

In some such embodiments, a plurality of customized candidate proficiency assessments representing the one or more associated devoid worker proficiencies can be transmitted over a network for completion by a plurality of associated workers.

In some additional alternative embodiments, the computer instructions can also include instructions for the processor to determine one or more secondary devoid candidate proficiencies for each candidate profile representing a differential between one or more skills required for project completion and an updated candidate skill proficiency data; generate a customized candidate proficiency sub-assessment representing the one or more secondary devoid candidate proficiencies; present the customized proficiency sub-assessment to an associated candidate; track the candidate's performance on the customized candidate proficiency sub-assessment; adjust the candidate skill proficiency data within the associated candidate's candidate profile based on the candidate's performance on the candidate proficiency assessment; update the weighted candidate match score; and update the candidate recommendation.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
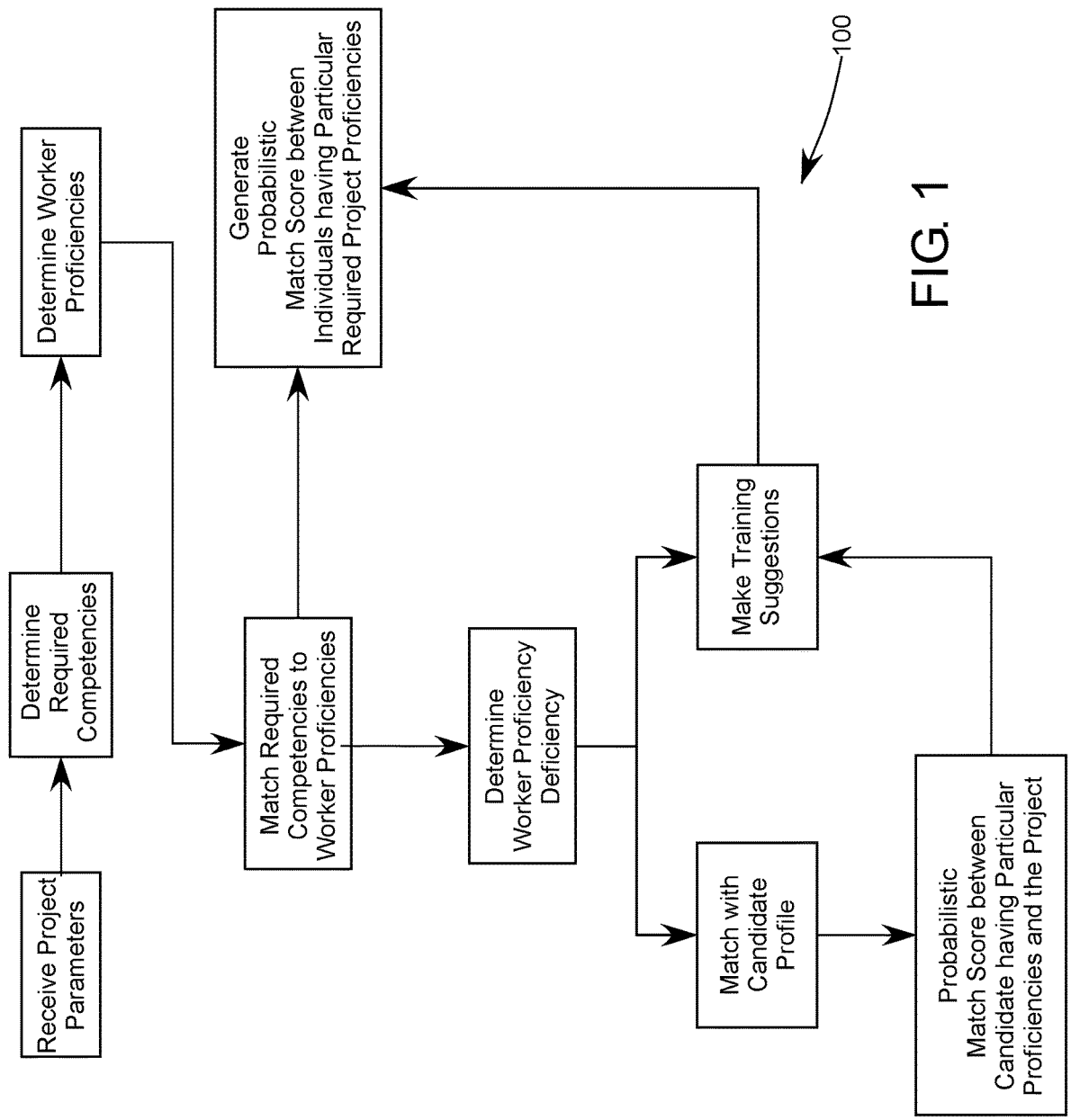
FIG. 1 illustrates a flow chart illustrating various method steps for determining competency deficiencies and matching between particular projects and available workers or candidates.

Reference will now be made to the exemplary embodiments illustrated, and specific language will be used herein to describe the same. It will nevertheless be understood that no limitation of the scope of the invention is thereby intended.

DETAILED DESCRIPTION

As discussed briefly above a method and system are contemplated herein which seek to increase project efficiency as well as optimize skill usage within a company by matching particular projects having a plurality of required competencies associated therewith with particular workers or employees having demonstrated proficiencies relating to the required competency requirements so as to ensure proper assignment to the best available worker or employee. In this manner, for a given project, an organization utilizing this system can then increase turnaround speed for assignments, as well as increase deliverable quality.

For example, a particular task may require various design as well as analysis of the design. In a more detailed example, a project might include the design of an impellor for a pump, which then requires fluid dynamic analysis with certain fluid viscosities or contaminant levels. While a particular software, i.e. project tool, might be suitable for the design and associated solid modeling, an alternative software might be more suited to perform both the solid modeling and the required fluid dynamics analysis. Further, in such a situation, while a particular employee or worker might have demonstrated skills in the drafting process and may be able to draw up a suitable 3D model of the part, this particular employee may be unfamiliar with the fluid dynamic analysis, while another employee might be familiar with the fluid dynamic modeling, while a third employee might be familiar with both. As such, the system as contemplated herein can match or give a probabilistic score representing the likelihood of the particular worker's ability to perform all the tasks in a proficient manner. The system does so by maintaining and updating a worker competency database which can draw competency information from a plurality of sources. Some exemplary sources, which will be discussed in more detail below can include past projects with associated necessary competencies, training history, completed assessments, tracked actions or workflows, etc.

However, in some situations a deficiency can be detected between the competencies of the various workers within an organization and the needs of a particular project. In order to solve this problem, in some embodiments, the system 10 can be configured to receive one or more candidate description files, such as cover letters, resumes, etc., and analyze or perform keyword searches on the candidate description file so as to extract information therefrom. In yet additional embodiments the system 10 can also extract competency information from a candidate profile database having information regarding one or more candidate competencies from various tracked or recorded parameters, such as a training database, publications, or assessments which may have been administrated during a previous hiring interview, or even similar worker information regarding the candidate as tracked by the system while working at a different organization. Then, based on the extracted information, i.e. matching between keywords and potential skill matches, associated skill matching to various required skills can be performed using similar methods to those skills and proficiencies as discussed above with respect to the user skill database. In some instances, profiles can be generated, when not previously established, for various candidates associated with the candidate description files, which can then allow for inclusion in a candidate skill database which can then be configured to track various skills of external candidates for current and future hiring needs. In some instances, candidate skills or competencies for the various candidates can be populated either automatically or manually within the candidate skill database based on keyword matching, with administrator or other user input, etc. It will then be appreciated that the candidate profile database and associated candidate competencies can then be matched to proficiency requirements of a given project and a probabilistic match score can then be generated for associated candidate profiles within the database and a hiring recommendation generated based thereon.

It will be appreciated that in some embodiments, a sales representative, supervisor, or any one of a plurality of suitable users might be best suited to provide input to the system regarding one or more project parameters into an input interface when receiving the project order or upon project review prior to assignment to a particular employee or team. Additionally, various organizations may have a plurality of varying tools at their disposal. For example, a company may only have a certain number of licenses to a particular drafting software and a certain number of licenses to an alternative software. As such, the system can then determine, or receive input, regarding the tools available or required for project completion.

It should also be appreciated that the database can be connected with workers that are both internal and external to a company. One of the benefits of having a system as described herein is that it is based on objective criteria that is recorded and maintained, as opposed to self-proclaimed or self-reported skillsets or proficiencies. Another advantage of the system is the true extent of a worker's skillsets or proficiencies with certain features of a tool can be readily ascertainable. For example, in a self-reported scenario two workers can claim to know how to use and use well Microsoft's Excel software. Whereas in practice worker 1 can successfully utilize the various regression tools, while worker 2 is proficient with creating and generating pivot tables. This example illustrates that for a given tool, and especially one that has hundreds if not thousands of functions, workers can be proficient at certain tasks utilizing particular features of the tool, while not being able to do other tasks.

It should also be understood that a program like Microsoft's excel has the ability to perform a given task in multiple ways; however, some approaches may be more efficient or effective than others. One example of efficiency could involve inputting and sorting data. Manually entering and sorting the data is a viable option; however, taking advantage of the various input and sorting features is more effective.

Having a system and method like the one described herein, allows for a clearer understanding and depth of a worker's proficiencies and skillsets that can be authenticated as opposed to self-reported, thus providing a more objective based approach for matching workers to particular projects, as well as providing targeted training.

As such, it has been recognized that if the system can be provided with necessary tool information, or otherwise determine the tool requirements for project completion, and then track worker proficiency with the features within the various available tools, thus allowing the system to use the tracked proficiency data of a given user or worker with regard to those tool's features in order to make a recommendation or provide a probabilistic match score between a given project and workers or users within the organization, candidates, etc., so as to ensure a given project receives the support necessary for a timely and quality completion.

In order to achieve these functions, contemplated herein is a project analysis and recommendation system 10 and method, which can be utilized to aid in the assignment of projects to particular individuals within an organization. The method and system, as shown in FIGS. 1-6, are configured to track various competencies of various workers within a given organization, associate those metrics to particular skillsets or competencies and determine matches of those skillsets or competencies with various jobs or projects and the identified competencies required for completing those jobs. It should be noted it is possible to apply this system and method across multiple organizations.

In particular, the system 10 can include a user interface 22 configured to receive user input regarding one or more project parameters, the one or more project parameters including information regarding one or more necessary competencies for project completion. The system can also include a non-transitory computer-readable medium 50 containing one or more sets of computer instructions 52 and a processor 30 configured to implement the one or more sets of computer instructions 52. The non-transitory computer-readable medium 50 can also include a worker profile database 54 which can contain a plurality of worker profiles, wherein each profile contains information regarding tracked worker skill proficiencies associated with one or more particular worker proficiencies.

While, in some instances the processor 30 and non-transitory computer readable medium 50 can be provided on a remote server 20 where the input interface interacts through a wireless or network connection in order to receive input, in some alternative instances the input interface can be integrally provided with the server 20 and input received directly and locally.

In some embodiments the system 10 can be provided with one or more historical databases 56, Worker profile databases 54, candidate profile or competency databases 62, wherein these databases can receive and track user and candidate actions, training modules, assessments, project histories, etc. wherein the historical database can then be utilized to track user and candidate interactions, extract the competencies demonstrated through these interactions, and then update each worker's or candidate's associated profile within the worker profile database or candidate profile database so as to allow for an iteratively updated competency profile for each worker or candidate.

In some embodiments, the system and computer instructions can include instructions for the processor to analyze the worker skill database; determine one or more weighted worker match scores comparing the one or more necessary competencies for project completion and one or more worker profiles having matched tracked worker skill proficiency data; and determine one or more deficiencies of one or more workers between the associated worker skill proficiencies and the one or more necessary competencies.

In some embodiments, the system can also determine or be provided with information regarding one or more tools which will be utilized by the worker in order to complete the project. As discussed above the one or more tools can include various software applications, but should not be limited to only computer software. For example, sensors are often utilized for tracking human behavior, and can track human motion, it is also contemplated herein that sensors can be utilized to track worker proficiency regarding various physical tasks, which physical tasks can be described by certain motions and compared to optimal motions for carrying out a particular task utilizing a particular tool having a particular feature set so as to determine a proficiency in a particular tool competency. Such motions could be as menial as proper form, body stance, and associated motions for swinging a tool such as an axe as determined by recorded optical sensor data or heat signature data. Sensors can also be integrated into equipment, such as heavy equipment, and track how the user operates the heavy equipment given their surroundings.

Tool information can include tool versions, features, etc. wherein one or more tools and one or more tool features can be required to complete a project. It will then be appreciated that the particular tool, or features within a tool, which are required for project completion can be input by a user, or such requirements can be automatically detected by tokenization and recognition of functions as extracted from a project description. Such automatic recognition can be achieved by providing a historical database of previous projects, their associated descriptions, tools used to complete the project, and actions taken by workers while working on the project. These historical databases can then be searched and compared to the current project parameters, and then matched to workers having the proficiencies matching the proficiencies displayed during the completion of previous similar projects.

Further, in some instances, and particularly where each of the weighted worker match scores are below a pre-determined threshold, or no workers are sufficiently available for work, the non-transitory computer-readable medium can then store a candidate skill database containing a plurality of candidate profiles having associated candidate skill proficiency data. In such a case the computer instructions can then be provided with additional instructions for the processor to perform the following tasks: analyze the candidate skill database having a plurality of candidate profiles, wherein each candidate profile contains information regarding various candidate skill proficiencies associated with one or more specific candidate skills; determine a weighted candidate match score comparing the plurality of necessary competencies and one or more potential candidate profiles having one or more specific candidate skills associated with the one or more available tools required for project completion; and determine one or more deficiencies of one or more candidates between associated candidate skill proficiencies and the one or more necessary competencies. In some such embodiments, the system can then generate an external candidate hire recommendation when the weighted worker match score drops below a predefined threshold value, as discussed above.

Alternatively, and in particular when weighted worker match scores are below a desired level or threshold, or even in situations where weighted candidate match scores are below a desired level or threshold, the system can then determine missing or deficient competencies which would bring the worker or the candidate above the threshold or otherwise improve their weighted match score. the system can then analyze the training module database 60 associated with the deficient competencies and generate a training recommendation to increase the weighted worker match score or the weighted candidate match score.

Alternatively, merely recognizing a deficient competency is not necessarily authoritative regarding whether a particular worker or candidate possesses a said competency or skill, but rather only illustrates a lack of tracked and recorded information regarding said competency. In such cases the system can then, instead of or in addition to providing training recommendations, access an assessment database, and present a particular assessment requiring the use or demonstration of a particular competency to the worker or candidate, wherein the worker or candidate can then perform the assessment and the system can then determine competency based on their performance and then update the worker or candidate profile database to include any demonstrated competency.

As such, the computer instructions can include instructions to retrieve, present, and track worker or candidate performance on one or more assessments. In such cases the assessment can have various actions associated therewith which correlate to worker proficiency upon giving correct answers, performing actions correctly, in a particular sequence etc. As such, completion can result in an assessment score and an associated proficiency with regard to that particular required competency from which a best fit can be determined thereby. Further, each assessment can be associated with a particular tool and features thereof wherein the system can then update each particular worker's or candidate's profile and particular worker or candidate skill competency or proficiency information based on the worker's or candidate's tracked assessments associated with each tool or competency.

In yet additional embodiments the historical databases can include various training modules associated with one or more necessary competencies and associated worker or candidate competencies and proficiencies. In some such cases the computer instructions can then further include instructions to track one or more particular worker's or candidate's training history data associated with each tool and update each worker's or candidate's profile and particular worker or candidate skill proficiency information based on the worker's or candidate's tracked training history data associated with each tool. In some such embodiments the historical database can include a library of available training modules etc. wherein the user's interactions with the training module can be tracked and receive an associated increase in demonstrated competency or proficiency.

In yet additional embodiments the computer instructions can further include instructions to track a plurality of user or candidate historical actions associated with one or more tools used to complete one or more workflows; and update each worker's or candidate's profile and particular worker or candidate skill proficiency information based on the worker's or candidate's tracked actions associated with one or more tools used to complete one or more workflows.

In some such embodiments, the system can be configured to track these actions remotely, however, in most cases a particular worker or candidate can then be provided with a personal computer or work center 70 which can include a local processor 72, a local non-transitory computer-readable medium 74, and associated computer instructions 76 instructing the processor 72 to utilize system input mechanisms to track user or candidate actions and transmit these actions back for recording in the worker or candidate profile database and thus be associated with the worker's profile information. In some such cases, these actions can include tool usage, tool feature usage, as detected through worker input while working on various current or previous projects, actions utilized while taking assessments or performing various tasks in training modules.

It will be understood that various keystrokes, hotkey usage, cursor movements, sensor input data received from one or more sensor input devices 80, etc. can be associated with various skills, sequences, motions, etc. which can then be correlated to particular proficiencies with using associate tool features. For example, a proficiency detection sensor 80, can be provided either locally or remotely to detect such input. Sensor 80 can include one or more optical (visible and IR), sound, other electromagnetic detection, weight distribution, temperature, velocity, accelerometer, gyroscopes, switches, GPS and other location-based components types of sensors or input detection components and systems. If the user can be tracked using a sensor with regards to performing a certain task using one or more tools then a baseline can be created and proficiency determined.

In some embodiments the processor 72 can also be configured to determine which tools are being utilized, which can be performed by determining which applications or computer programs are running on a given computer 70, or in some sensor data input situations, tool recognition can be performed using image recognition functions.

In yet additional embodiments the databases can include one or more proficiency assessment databases 58, wherein the proficiency assessment database 58 contains proficiency assessments, the proficiency assessments relating to the tracked worker or candidate skill proficiencies associated with one or more particular worker or candidate proficiencies. The system 10 can then include computer instructions which direct the one or more processors to present one of the proficiency assessments to at least one worker or candidate; track performance data for the worker or candidate on the proficiency assessment; and update each worker's profile and particular worker skill proficiency information based on the associated worker's or candidate's performance on the proficiency assessment.

In some such embodiments a previous workflow can be generated representing an optimal sequence or method for completing one or more tasks in an assessment. In such cases the ultimate proficiency score on such an assessment can be adjusted based on whether a worker or candidate achieved a correct answer, how long the worker or candidate required to complete the assessment, and deviations from an optimal or most efficient path to completion. The ultimate proficiency score on a given assessment can then have a corresponding effect on a level of competency of a given worker or candidate for an associated set of particular competencies covered by the particular assessment.

In yet additional embodiments the non-transitory computer-readable media 50 can include a training module database 60, wherein the training module database 60 contains training information relating to various tracked worker or candidate skill proficiencies associated with one or more particular worker or candidate competencies. The processor can then be instructed to present one of the training modules to at least one worker or candidate; track completion of each training module; and update each worker's or candidate's profile and particular worker or candidate skill proficiency information based on the completion of each training module.

In yet additional embodiments the historical databases 56 can include a historical actions workflow database, wherein the historical actions workflow database contains historical actions taken by one or more workers or candidates to complete one or more workflows, i.e. past projects, trainings, etc. In some such embodiments the historical actions can then be tracked and related back to or allow for adjustment of the particular worker's or candidate's tracked skill proficiencies. As such, the one or more processors can then analyze the historical actions taken by each worker or candidate; and update each worker's or candidate's profile and particular worker or candidate skill proficiency information based on the analyzed historical actions.

In yet additional embodiments the computer instructions can further include instructions to generate a match score between a plurality of worker profiles or candidate profiles having associated competency or skill information; and display a listing of ranked matched worker or candidate profiles based on the match score. In some such embodiments, the match score can be generated giving a first greater weight to analyzed historical actions regarding one or more previously completed workflows, a second lesser weight to performance assessments, and a third lesser weight to completed training modules.

The system can also be configured to determine one or more devoid worker proficiencies for each worker profile representing a differential between one or more skills required for project completion and the worker skill proficiency data. Then based on the devoid worker proficiency data the system can generate a customized worker proficiency assessment representing the one or more devoid worker proficiencies which can then be presented to an associated worker. At which point the system can then track the worker's performance on the customized worker proficiency assessment and adjust the worker skill proficiency data within the associated worker's worker profile based on the worker's performance on the worker proficiency assessment. Ultimately the system can then update the weighted worker match score and update the worker recommendation. In some such embodiments, the one or more customized worker proficiency assessments representing the one or more associated devoid worker proficiencies can be transmitted over a network for completion by a plurality of associated workers.

The system can also be configured to determine one or more devoid candidate proficiencies for each candidate profile representing a differential between one or more skills required for project completion and the candidate skill proficiency data. Then based on the devoid candidate proficiency data the system can generate a customized candidate proficiency assessment representing the one or more devoid candidate proficiencies which can then be presented to an associated candidate. At which point the system can then track the candidate's performance on the customized candidate proficiency assessment and adjust the candidate skill proficiency data within the associated candidate's candidate profile based on the candidate's performance on the candidate proficiency assessment. Ultimately the system can then update the weighted candidate match score and update the candidate recommendation. In some such embodiments, the one or more customized candidate proficiency assessments representing the one or more associated devoid candidate proficiencies can be transmitted over a network for completion by a plurality of associated candidates.

The system can also be configured to determine one or more secondary devoid candidate proficiencies for each candidate profile representing a differential between one or more skills required for project completion and the candidate skill proficiency data. Then based on the secondary devoid candidate proficiency data the system can generate a customized candidate proficiency sub-assessment representing the one or more secondary devoid candidate proficiencies which can then be presented to an associated candidate. At which point the system can then track the candidate's performance on the customized candidate proficiency sub-assessment and adjust the candidate skill proficiency data within the associated candidate's candidate profile based on the candidate's performance on the candidate proficiency sub-assessment. Ultimately the system can then update the weighted candidate match score and update the candidate recommendation based on performance on the sub-assessment.

In yet additional embodiments the computer instructions can further include instructions to access or store a published works database 90, wherein the published works database contains information relating to one or more published works generated by one or more particular workers, wherein the one or more published works are associated with one or more tracked worker skill proficiencies. The one or more processors can then be configured to track generation of one or more published works by one or more workers and update each worker's profile and particular worker skill proficiency information based on the generation of published works. In some such embodiments, the probability match of each worker can be affected by the published works from a plurality of categories, which can include peer reviewed third-party publications; non-reviewed third-party publications; and self-publications. It will be appreciated that publications can have differing levels of authority based on the level of scrutiny required. That peer reviewed publications might establish one as an authority on a topic. Meanwhile, some journals, while not peer reviewed might give more authority than others, and ultimately self-published means, like websites or blogs, might be accurate, but ultimately have less authoritative weight. In some instances, the system may also be configured to track public reception by other workers or experts and adjust the ultimate weight of publications on the competency information according to such positive or negative peer treatment.

Another way of expressing the above is a database can contain automatically tracked information with regards to training that a worker has completed, assessments a worker has taken, previous projects or workflows a worker has performed relative to a given tool, utilizing a set of features of that tool related to a particular task. Additionally, the database can contain information regarding publications a worker has created, which can also be automatically tracked or manually input. Each of these sets of information can be weighted to determine an overall assessment when determining a match, score or recommendation for a given project.

It will be further appreciated that the various embodiments, tasks, and features of the system are discussed for purposes of exemplary discussion wherein each of which can also be carried out manually as a method implementation. Further, any particular steps or tasks can also be combined with any other steps or tasks discussed herein as deemed appropriate.

It will be understood that each of the plurality of worker profiles contained within the worker skill database can vary between each worker, wherein each worker has an associated worker skill proficiency for a plurality of features for various tools, i.e. software types, brands, functions within that software, etc. In some instances, each worker profile can be manually input by each worker upon profile creation, and then be updated periodically manually. However, it is of particular advantage to update the worker skill database on a continual and iterative basis using processing circuitry and activity tracking. It will be appreciated that in some instances, a software program, such as an add-on, or a background module provided in the one or more programs, or on the worker's particular computer 70, can be utilized to track worker behavior and the worker skill database can then be automatically modified based on worker behavior. For example, a design program can be provided with an add-on which tracks functions, features, commands, keystrokes, hotkeys used, or any other potential parameter within a program. For purposes of illustration, if a particular worker regularly uses a strength analysis function in a design program, the use of that function can be tracked, and through repeated use it can then be assumed that the particular worker is proficient in using that particular command or function. As such, the use of that command or function can then be recognized by the program, add-on, and reported for inclusion in the worker skill database and associated with the particular worker's skillset.

It will be appreciated that a weighted or probabilistic match score can be provided with respect to a plurality of workers. For example, a first worker might have a demonstrated and tracked proficiency in 90% of the required competencies, while a second worker might have a demonstrated and tracked proficiency in 85% of the required competencies, however, the first worker has more ore-existing project assignments in their queue, so the ultimate assignment of the project is made to the second worker because the second worker will still be able to do a high-quality job on the project, but while the particular turnaround time might be longer on the particular project, the ultimate turnaround time might be less due to the number of projects in their respective queues.

It will also be appreciated that various software programs offer various tutorials and trainings which can aid worker's in becoming proficient at certain commands or competencies without the need to repetitively use a particular skill. As such, in some embodiments, the system can also be configured to recognize and track one or more pre-existing trainings associated with at particular tool which was accessed, presented to, or received by a particular worker and update the worker skill proficiencies associated with an associated particular worker. Such trainings can particularly include query commands by workers regarding how to use particular functions within a program. As such, the fact that a worker has made a query, and perhaps performed a particular task related to the query or training can then be updated within the worker skill database.

It will also be appreciated that various worker's may have previously worked on alternative projects which required use of a particular software program and various functions within that program. As such, the system can track one or more previously completed projects associated with one or more workers and the associated particular project competencies required to complete the previously completed project. The particular required skillsets or competencies for the previous project can then be assumed to have been used, and ultimately mastered to a certain degree, by the worker, and the skill proficiencies associated with an associated particular worker can then be updated in the worker proficiency database.

Figure 2:
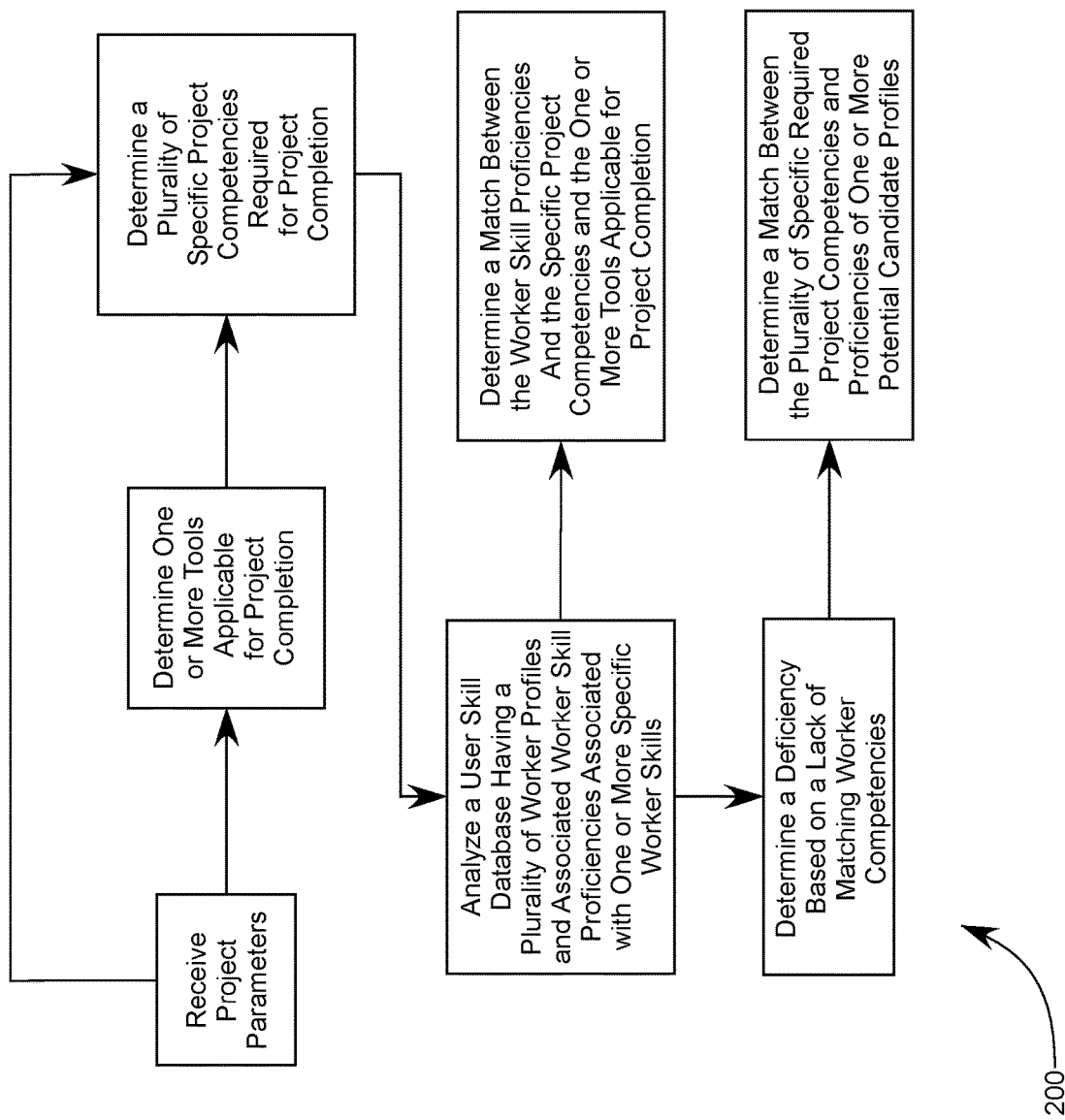
FIG. 2 illustrates an alternative flow chart illustrating various additional method steps as part of the system and method for determining competency deficiencies and matching between particular projects and available workers or candidates.
Figure 3:
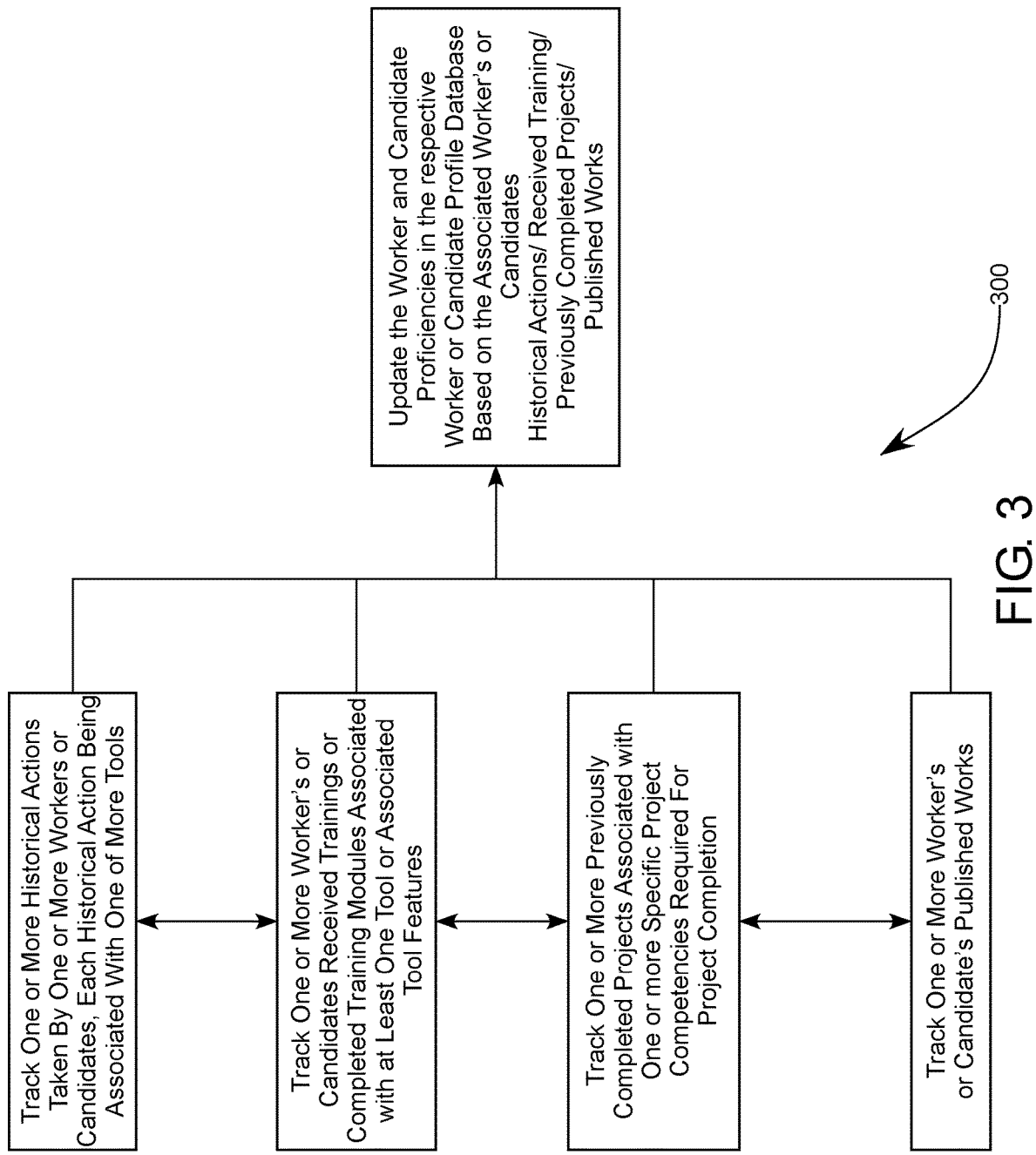
FIG. 3 illustrates yet another alternative flow chart illustrating various additional method steps as part of the system and method for determining competency deficiencies and matching between particular projects and available workers or candidates.
Figure 4:
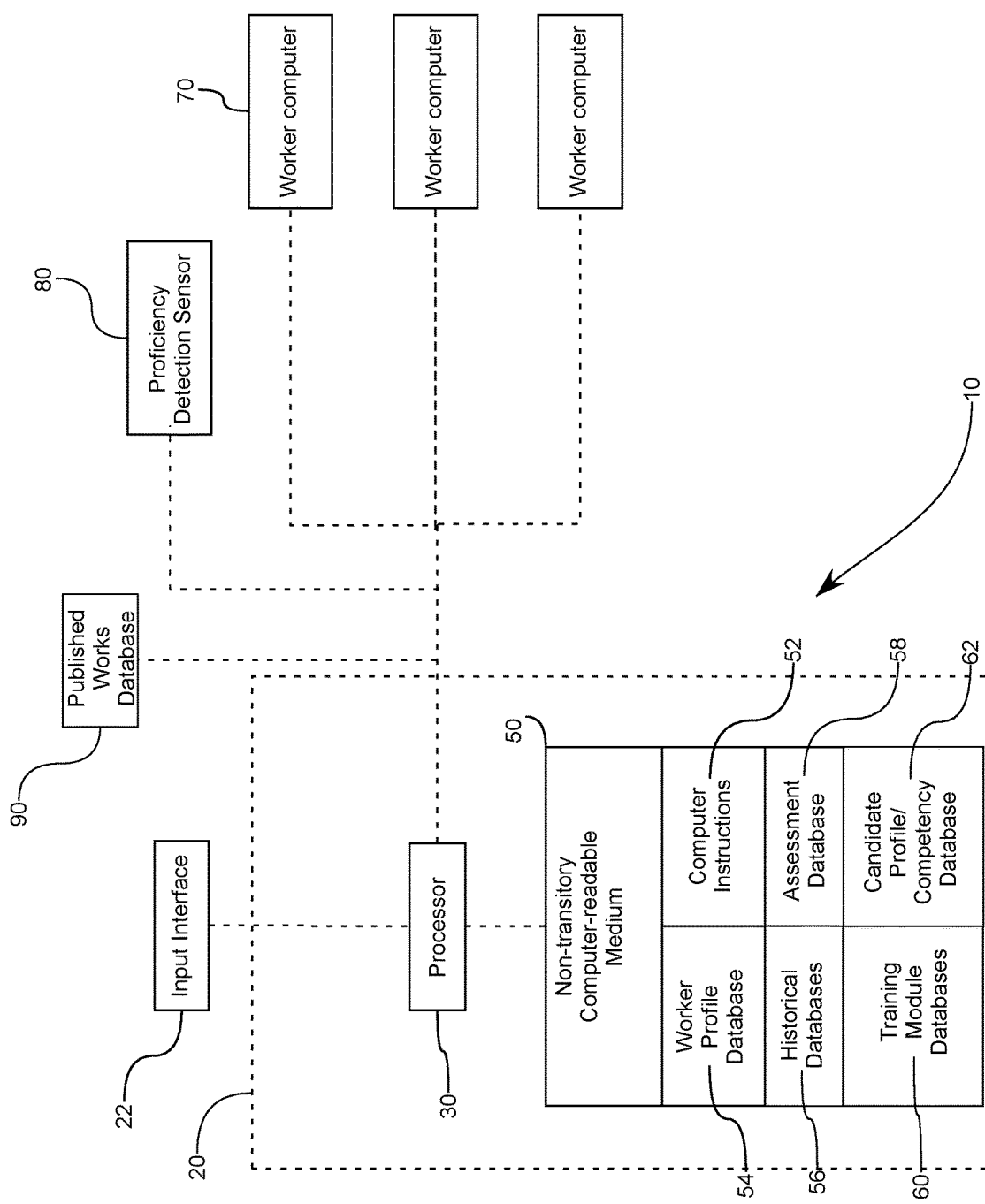
FIG. 4 illustrates an exemplary schematic of a system which can be configured to carry out the method steps as part of the system and method for matching and determining gaps between available individuals and associated skillsets with a particular project's skill requirements as illustrated in any of the preceding figures.
Figure 5:
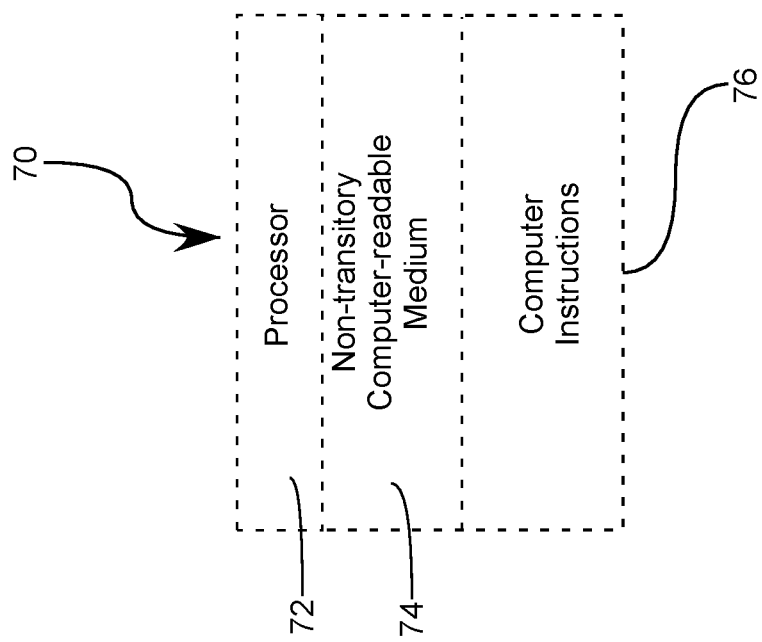
FIG. 5 illustrates an exemplary schematic of a personal worker or candidate computer or input device.

It will be understood, that while some of the steps are discussed in context with respect to the system and implementations thereof, a standalone method, as illustrated in-part by flowcharts 100, 200, and 300 in FIGS. 1-3, for determining competency deficiencies and matching between particular projects and available workers or candidates is contemplated herein wherein the steps performed by the system above can be performed without the recited hardware of the system. This method can include the steps of: creating a project profile; receiving input regarding one or more project parameters being associated with the project profile, the project parameters including at least information regarding one or more necessary competencies for project completion; analyzing a worker skill database having a plurality of worker profiles and associated worker skill proficiencies associated with one or more specific worker skills; analyzing a worker profile database having a plurality of worker profiles, wherein each use profile contains information regarding various worker skill proficiencies associated with one or more specific worker skills; determining a match between the plurality of necessary competencies for project completion and one or more worker profiles having matched worker skill proficiencies associated with the plurality of necessary competencies for project completion; analyzing a candidate skill database having a plurality of candidate profiles, wherein each candidate profile contains information regarding various worker skill proficiencies associated with one or more specific candidate skills; determining a weighted candidate match score comparing the plurality of necessary competencies and one or more potential candidate profiles; and determining one or more deficiencies of one or more workers between associated worker skill proficiencies and the one or more necessary competencies.

In some embodiments the method can also include the step of receiving worker input regarding one or more available tools required for project completion.

In some embodiments the method can also include the steps of: storing a proficiency assessment database on the non-transitory computer-readable medium, wherein the proficiency assessment database contains one or more proficiency assessments, the one or more proficiency assessments relating to the various worker skill proficiencies associated with one or more specific worker skills; presenting the one of the proficiency assessments to at least one worker; tracking performance data for the worker on the proficiency assessment; and updating each worker's profile and an associated specific tracked worker skill proficiency data based on the associated worker's performance on the proficiency assessment.

In some embodiments the method can also include the steps of: tracking one or more worker's interactions with at least one of the one or more available tools; and updating the tracked worker skill proficiency data associated with an associated specific worker skill within the worker skill database based on the associated worker's interactions with each associated available tool.

In some embodiments the method can also include the steps of: tracking a plurality of historical actions relating one or more previously completed workflows associated with one or more workers and one or more associated necessary competencies for project completion; and updating each worker's profile and an associated specific tracked worker skill proficiency data based on the associated worker's associated one or more previously completed workflows.

In some embodiments the method can also include the step of: generating a training recommendation to increase the weighted worker match score or the weighted candidate match score when the weighted worker match score or weighted candidate match score is below a predefined threshold value.

In some embodiments the method can also include the steps of: receiving a candidate description file; determining matches between keywords from the description and one or more candidate skill proficiencies; and populating an associated candidate profile and a plurality of specific candidate proficiency data associated with each candidate profile.

In some embodiments the method can also include the steps of: determining one or more devoid worker proficiencies for each worker profile representing a differential between one or more skills required for project completion and the tracked worker skill proficiency data; generating a customized worker proficiency assessment representing the one or more devoid worker proficiencies; presenting the customized proficiency assessment to an associated worker; tracking the worker's performance on the customized worker proficiency assessment; adjusting the tracked worker skill proficiency data within the associated worker's worker profile based on the worker's performance on the customized worker proficiency assessment; updating the weighted worker match score based on the worker's performance on the worker proficiency assessment; and updating the worker recommendation.

In some embodiments the method can also include the steps of: determining one or more devoid candidate proficiencies for each candidate profile representing a differential between one or more skills required for project completion and the candidate skill proficiency data; generating a customized candidate proficiency assessment representing the one or more devoid candidate proficiencies; presenting the customized proficiency assessment to an associated candidate; tracking the candidate's performance on the customized candidate proficiency assessment; adjusting the candidate skill proficiency data within the associated candidate's candidate profile based on the candidate's performance on the candidate proficiency assessment; updating the weighted candidate match score based on the candidate's performance on the candidate proficiency assessment; and updating the candidate recommendation.

In each of these embodiments a completion procedure can involve various commands and actions is tracked by the processor in real time for each customized worker assessment and each customized candidate assessment, wherein the completion procedure utilized by the worker or candidate is compared to a determined optimal completion procedure. Further, each a worker or candidate assessment completion procedure can be compared to the optimal completion procedure with respect to deviations from particular sequential steps and total time required to complete.

In some embodiments the method can also include the steps of: generating a customized training program based on deficiencies determined from the customized worker proficiency assessment and the customized candidate proficiency assessment; and presenting the customized training program based on deficiencies determined from the customized worker proficiency assessment and the customized candidate proficiency assessment.

In some embodiments the method can also include the steps of: transmitting one or more customized worker or candidate proficiency assessments representing the one or more associated devoid worker or candidate proficiencies over a network for completion by a plurality of associated workers or candidates.

In some embodiments the method can further include the steps of: providing a published works database, wherein the published works database contains information relating to one or more published works generated by one or more particular workers, wherein the one or more published works are associated with one or more tracked worker proficiencies; tracking generation of one or more published works by one or more workers; and updating each worker's profile and particular worker proficiency information based on the generation of published works. In some such embodiments the probability match of each worker can be affected by the published works from a plurality of categories, the plurality of categories including: peer reviewed third-party publications, non-reviewed third-party publications, and self-publications.

Figure 6:
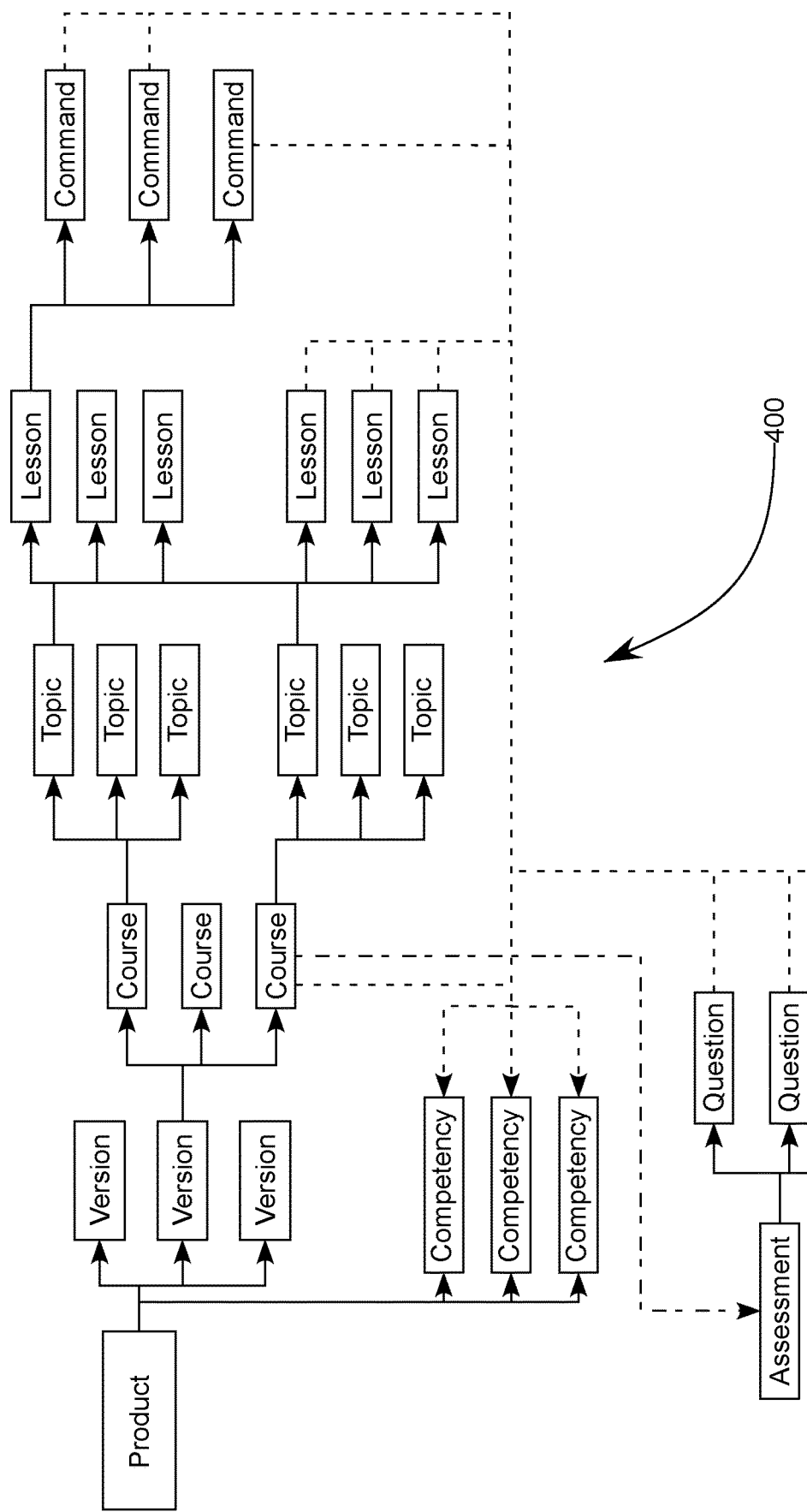
FIG. 6 illustrates a data structure which can be implemented within the various embodiments discussed herein for tracking various worker or candidate competencies or metrics.

It will be appreciated that FIG. 6 illustrates an exemplary data structure and flow chart 400 which illustrates how various of the databases, training modules, assessments, etc., can relate back or otherwise allow the system to track competencies of workers or candidates.

In yet additional embodiments a worker can provide a written project description and the processor can analyze the written description and match keywords with one or more trackable worker proficiencies within the worker proficiency database. The processor can then automatically populate at least a portion of list of required competencies for the particular project.

In some instances, the user can be prompted to provide supplemental input regarding required competencies. In some such embodiments, the user providing the project details can be asked a plurality of queries relating to particular details about the new project which relate to various competencies tracked within the worker proficiency database. In some such instances, the queries can be provided in one or more chains arranged into specific hierarchies. For example, "does this project require drafting?", "does the customer prefer a specific file format?", "does the project require strength analysis?", "does the project require load/fatigue analysis?", wherein each question can automatically narrow the search field within the worker proficiency database for potential worker proficiency matches based on the project receiving user's input.

In yet additional embodiments input can be received regarding competency importance for each required competency for the new project. The competency requirements can then be given a weighted requirement score. Accordingly, the relative competency proficiency or strength for each worker and each associated competency can also be adjusted and weighted with regard to their associated proficiency with regard to that competency. Further, the processor can then determine a weighted match between the project and a particular worker based on relative competency importance weight, and relative competency strength or proficiency in the various competencies.

It will also be appreciated that various users or candidates may have previously worked on alternative projects which required use of a particular software program and various functions within that program. As such, the system can track one or more previously completed projects associated with one or more users and the associated specific project skills required to complete the previously completed project. The particular required skillsets for the previous project can then be assumed to have been used by the user, and the skill proficiencies associated with an associated specific user can then be updated in the user skill database. Again, each of these additional data points (tests and completed projects) can be part of the overall weighted score.

In some instances, each user's computer 60 can be loaded with an additional program which can keep track of time spent in various particular programs, i.e. AutoCad™ or SolidWorks™, and can also track user keystrokes when utilizing a specific program. Keystrokes can then be compared to a command list or hotkey list and a determination of used functions and frequency of use can be determined with regard to each particular program. It can then be assumed that repeated use of certain functions relates to a proficiency with respect to that particular function, and the user skill database can be updated accordingly.

It is noted that no specific order is required in the aforementioned methods, though generally these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

In yet additional embodiments a user can provide a written project description and the processor can analyze the written description and match keywords with one or more trackable user skills within the user skill database. The processor can then automatically populate at least a portion of list of required skills for the particular project.

In some instances, the user can be prompted to provide supplemental input regarding required skills. In some such embodiments, the user providing the project details can be asked a plurality of queries relating to specific details about the new project which relate to various skills tracked within the user skill database. In some such instances, the queries can be provided in one or more chains arranged is specific hierarchies. For example, "does this project require drafting?", "does the customer prefer a specific file format?", "does the project require strength analysis?", "does the project require load/fatigue analysis?", wherein each question can automatically narrow the search field within the user skill database for potential user skill matches based on the project receiving user's input.

In yet additional embodiments input can be received regarding skill importance for each required skill for the new project. The skill requirements can then be given a weighted requirement score. Accordingly, the relative skill proficiency or strength for each user and each associated skill can also be adjusted and weighted with regard to their associated proficiency with regard to that skill.

Further, the processor can then determine a weighted match between the project and a particular user based on relative skill importance weight, and relative skill strength or proficiency in the various skills.

The following illustrates one exemplary lambda notation of various computer instructions configured to instruct a processor to implement various aspects of the present invention:

```
var totalLessons = (from I in
Context.Lessons
    var totallessons = (from I in Context.Lessons
        join pcI in Context.LessonConcepts on I.Id equals pcI.LessonId
        join pupc in Context.ProjectUserProductCompetencies on
            pcI.ProductConceptId equals
            pupc.CompetencyId
        where projectUserIds.Any(pu =>
            pupc.ProjectUserProduct.Projectuser.Id == pu)
        select I).Distinct( ).Count( );
    var totalQuestions = (from pc in Context.ProductConcepts
        join pcI in Context.LessonConcepts on pc.Id equals
            pcI.ProductConceptId
        join ql in Context.QuestionLessons on pcI.LessonId equals
            ql.LessonId
        join q in Context.Questions on ql.QuestionId equals q.Id
        join pupc in Context.ProjectUserProductCompetencies on
            pcI.ProductConceptId equals pupc.CompetencyId
        where (q.OwningOrganizationId == null || q.OwningOrganizationId ==
            organizationId) && pcI.ProductConceptId == pc.Id
        && projectUserIds.Any(pu =>
            pupc.ProjectUserProduct.ProjectUser.Id == pu)
        select q).Distinct( ).Count( );
        var group = await (from u in Context.Users
        join ou in Context.OrganizationUsers on u.Id equals ou.UserId
join lessons in (from luv in Context.LessonUserViews
join lc in Context.LessonConcepts on luv.LessonId equals lc.LessonId
join pupc in Context.ProjectUserProductCompetencies on lc.ProductConceptId
equals pupc.CompetencyId
join pup in Context.ProjectUserProducts on pupc.ProjectUserProductId equals
pup.Id
select new { luv, lc, pupc, pup }).DefaultIfEmpty( ) on u.Id equals lessons.luv.UserId
join questions in (from ua in Context.UserAssessments
join uaq in Context.UserAssessmentQuestions on ua.Id equals
uaq.UserAssessmentId
```

-continued

```
join a in Context.Answers on uaq.AnswerId equals a.Id
join ql in Context.QuestionLessons on uaq.QuestionId equals ql.QuestionId
join aluv in Context.LessonUserViews on ql.LessonId equals aluv.LessonId
join alc in Context.LessonConcepts on aluv.LessonId equals alc.LessonId
join apupc in Context.ProjectUserProductCompetencies on lc.ProductConceptId
    equals apupc.CompetencyId
join apup in Context.ProjectUserProducts on apupc.ProjectUserProductId equals
    apup.Id
select new { ua, apupc, apup, ql, alc, a }).DefaultIfEmpty( ) on u.Id equals
    questions.ua.UserId
where
(lessons.lc.ProductConceptId == lessons.pupc.CompetencyId ||
questions.alc.ProductConceptId == questions.apupc.CompetencyId)
  && (projectUserIds.Any(pu => pu == lessons.pup.ProjectUserId) ||
      projectUserIds.Any(pu => pu == questions.apup.ProjectUserId))
  && ou.OrganizationId == organizationId
//group new { User = u, pup.ProjectUserId, Lessons = luv, Questions = ql } by new {
    pup.ProjectUserId, u } into g
select new { User = u, ProjectUserId = lessons.pup.ProjectUserId, ConceptId =
    lessons.pupc.Competency.Id, Concept = lessons.pupc.Competency.Name,
    Lessons = lessons.luv, Question = questions.ql.Question, Answer =
    questions.a, TotalQuestions = totalQuestions, TotalLessons = totalLessons
    }).ToArrayAsync( );
var agroup = group.GroupBy(g => new { g.Concept, g.ConceptId, g.ProjectUserId,
    g.User });
var bgroup = agroup.GroupBy(u => new { u.Key.ProjectUserId, u.Key.User });
var results = bgroup.GroupBy(b => b.Key.ProjectUserId).Select(r => new
    ProjectUserRankDto
        {
ProjectUserId = r.Key,
MatchingUsers = (from u in r
                                                                          let
Concepts = (from c in u
let CorrectQuestions = c.Select(a => a.Answer).Distinct( ).Count(a =>
    a.PercentCredit > 0)
let TotalQuestions = c.Select(q => q.TotalQuestions).Max( )
let IncorrectQuestions = c.Select(a => a.Answer).Distinct( ).Count(a =>
    a.PercentCredit == 0)
let LessonViews = c.Select(l => l.Lessons).Distinct( ).Count( )
let TotalLessons = c.Select(l => l.TotalLessons).Max( )
let LessonRank = TotalLessons == 0 ? 0f : (float)LessonViews / (float)TotalLessons
let QuestionRank = TotalQuestions == 0 ? 0f : (float)(CorrectQuestions –
    IncorrectQuestions) / (float)TotalQuestions
select new ProjectUserConceptMatchDto
        {
Concept = c.Key.Concept,
ConceptId = c.Key.ConceptId,
CorrectQuestions = CorrectQuestions,
TotalQuestions = TotalQuestions,
IncorrectQuestions = IncorrectQuestions,
LessonViews = LessonViews,
TotalLessons = TotalLessons,
  Score = QuestionRank > LessonRank ? QuestionRank : ((float)((CorrectQuestions
      – IncorrectQuestions) * 1.2 + LessonViews) / (float)(TotalQuestions +
      TotalLessons))
                  }).OrderByDescending(o => o.Score)
                                                                          sel
ect new ProjectUserMatchDto
        {
    Score = Concepts.Count( ) == 0 ? 0 : ((Concepts.Sum(s => (float?)s.Score)
?? 0f) / (float)Concepts.Count( )) * 100.0f,
      Userid = u.Key.User.Id,
      Username = u.Key.User.Name,
      Concepts = Concepts
                                                                          }).
OrderByDescending(o => o.Score)
            });
return results.Where(u => projectUserIds.Any(p => p == u.ProjectUserId));
```

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A project analysis and recommendation system:
   a user interface configured to receive user input regarding one or more project parameters related to a project, the one or more project parameters including at least information regarding one or more necessary competencies for project completion;
   a non-transitory computer-readable medium containing one or more sets of computer instructions, a worker skill database containing a plurality of worker profiles having associated tracked worker skill proficiency data, and a project parameter database; and
   a processor configured to implement the one or more sets of computer instructions from the non-transitory computer-readable medium, the computer instructions containing instructions for the processor to perform the following tasks:
   automatically track a plurality of workers' interactions with each tool used in one or more workflows, and wherein the interactions include keystrokes and cursor movements;
   update each worker's profile and worker skill proficiency data into a worker skill database based on the worker's tracked interactions associated with each tool used to complete the one or more workflows;
   automatically track a plurality of workers' training history data;
   update each worker's profile and worker skill proficiency data into the worker skill database based on the worker's tracked training history data;
   analyze the worker skill database and determine a weighted worker match score for each worker profile by comparing the one or more necessary competencies for project completion to the worker skill proficiency data; and
   determine and list one or more deficiencies of at least one of the worker profiles based on the received user input regarding one or more project parameters related to a project.

2. The project analysis and recommendation system of claim 1, wherein the user interface is configured to receive user input regarding one or more available tools necessary for project completion.

3. The system of claim 2, wherein the non-transitory computer-readable medium stores a candidate skill database containing a plurality of candidate profiles having associated candidate skill proficiency data; and wherein the computer instructions include instructions for the processor to perform the following tasks:
   analyze the candidate skill database having the plurality of candidate profiles, wherein each candidate profile contains information regarding various candidate skill proficiencies associated with one or more specific candidate skills;
   determine a weighted candidate match score comparing the plurality of necessary competencies and one or more potential candidate profiles having one or more specific candidate skills associated with the one or more available tools required for project completion; and
   determine one or more deficiencies of one or more candidates between associated candidate skill proficiencies and the one or more necessary competencies.

4. The project analysis and recommendation system of claim 3, wherein the computer instructions further include instructions for the processor to perform the following task:
   generate an external candidate hire recommendation when the weighted worker match score drops below a predefined threshold value.

5. The project analysis and recommendation system of claim 3, wherein the computer instructions further include instructions for the processor to perform the following tasks:
   track a plurality of historical actions relating to one or more previously completed workflows associated with each of the plurality of workers and candidates, and wherein the completed workflows have one or more associated necessary competencies for workflow completion; and
   update each of the plurality of workers' profiles and plurality of candidate profiles and the associated specific tracked worker skill or candidate skill proficiency data, based on each of the workers' or candidates' completed workflows;
   wherein the non-transitory computer-readable medium includes a proficiency assessment database, wherein the proficiency assessment database contains one or more proficiency assessments, the one or more proficiency assessments relating to the various worker skill proficiencies associated with one or more specific worker skills;
   wherein the computer instructions further include instructions for the processor to perform the following tasks:
   present at least one proficiency assessment to at least one of the plurality of workers or candidates;
   track performance data from the at least one proficiency assessment; and
   update each of the plurality of workers' profiles and plurality of candidate profiles and the associated specific tracked worker skill or candidate skill proficiency data based on each of the workers' or candidates' performance for each of the completed proficiency assessments; and
   wherein the weighted worker match score and the weighted candidate match score are generated giving a first greater weight to tracked worker skill proficiency data or candidate skill proficiency data on the performance assessments, a second lesser weight to historical actions regarding one or more previously completed workflows, and a third lesser weight to worker training history data or candidate training history data.

6. The project analysis and recommendation system of claim 3, wherein the computer instructions contain instructions for the processor to receive a candidate description file and determine matches between keywords from the description and auto populate an associated candidate profile and a plurality of specific candidate skills associated with each candidate profile.

7. The project analysis and recommendation system of claim 3, wherein the computer instructions further include instructions for the processor to perform the following tasks:
   determine one or more devoid candidate proficiencies for each candidate profile representing a differential between one or more skills required for project completion and the candidate skill proficiency data;
   generate a customized candidate proficiency assessment representing the one or more devoid candidate proficiencies;
   present the customized proficiency assessment to an associated candidate;
   track the candidate's performance on the customized candidate proficiency assessment;
   adjust the candidate skill proficiency data within the associated candidate's candidate profile based on the candidate's performance on the candidate proficiency assessment;
   update the weighted candidate match score; and
   update the candidate recommendation.

8. The project analysis and recommendation system of claim 7, wherein the computer instructions further include instructions for the processor to perform the following tasks:
   determine one or more devoid worker proficiencies for each worker profile representing a differential between one or more skills required for project completion and the tracked worker skill proficiency data;
   generate a customized worker proficiency assessment representing the one or more devoid worker proficiencies;
   present the customized proficiency assessment to an associated worker;
   track the worker's performance on the customized worker proficiency assessment;
   adjust the tracked worker skill proficiency data within the associated worker's worker profile based on the worker's performance on the customized worker proficiency assessment;
   update the weighted worker match score; and
   update the worker recommendation.

9. The project analysis and recommendation system of claim 8, wherein a completion procedure involving various commands and actions is tracked by the processor in real time for each customized worker assessment and each customized candidate assessment, wherein the completion procedure utilized by the worker or candidate is compared to a determined optimal completion procedure.

10. The project analysis and recommendation system of claim 9, wherein a worker assessment completion procedure is compared to the optimal completion procedure with respect to deviations from particular sequential steps and total time required to complete.

11. The project analysis and recommendation system of claim 9, wherein a completion procedure involving various commands and actions is tracked by the processor by means of sensor input and worker input or candidate input received during the assessment.

12. The project analysis and recommendation system of claim 8, wherein the processor can generate and present customized training content based on deficiencies determined from the customized worker proficiency assessment and the customized candidate proficiency assessment.

13. The s project analysis and recommendation system of claim 8, wherein one or more customized worker proficiency assessments representing the one or more associated devoid worker proficiencies are transmitted over a network for completion by a plurality of associated workers.

14. The project analysis and recommendation system of claim 7, wherein one or more customized candidate proficiency assessments representing the one or more associated devoid candidate proficiencies are transmitted over a network for completion by a plurality of associated candidates.

15. The project analysis and recommendation system of claim 7, wherein the computer instructions further include instructions for the processor to perform the following tasks:
   determine one or more secondary devoid candidate proficiencies for each candidate profile representing a differential between one or more skills required for project completion and an updated candidate skill proficiency data;
   generate a customized candidate proficiency sub-assessment representing the one or more secondary devoid candidate proficiencies;
   present the customized proficiency sub-assessment to an associated candidate;
   track the candidate's performance on the customized candidate proficiency sub-assessment;
   adjust the candidate skill proficiency data within the associated candidate's candidate profile based on the candidate's performance on the candidate proficiency assessment;
   update the weighted candidate match score; and
   update the candidate recommendation.

16. The project analysis and recommendation system of claim 1, wherein the non-transitory computer-readable medium includes a training database and the computer instructions further include instructions for the processor to perform the following task:
   generate a training recommendation to increase the weighted worker match score when the weighted worker match score drops below a predefined threshold value.

17. The project analysis and recommendation system of claim 1, wherein the computer instructions further include instructions for the processor to perform the following tasks:
   track one or more worker's interactions with the one or more available tools; and
   update the tracked worker skill proficiency data associated with an associated specific worker skill within the worker skill database based on the associated worker's interactions with the one or more available tools.

18. The project analysis and recommendation system of claim 1, wherein the automatically tracked plurality of workers' training history data includes training and usage data associated with each tool for each of the plurality of workers.

19. The project analysis and recommendation system of claim 1, wherein the computer instructions further include instructions for the processor to perform the following tasks:
   track a plurality of historical actions relating to one or more previously completed workflows associated with each of the plurality of workers, and wherein the completed workflows have one or more associated necessary competencies for workflow completion; and update each of the plurality of workers' profiles and associated specific tracked worker skill proficiency data, based on each of the workers' completed workflows.

20. The project analysis and recommendation system of claim 1, wherein the non-transitory computer-readable medium includes a proficiency assessment database, wherein the proficiency assessment database contains one or more proficiency assessments, the one or more proficiency assessments relating to the various worker skill proficiencies associated with one or more specific worker skills; and wherein the computer instructions further include instructions for the processor to perform the following tasks:

present at least one proficiency assessment to at least one of the plurality of workers;

track performance data from the at least one proficiency assessment;

update each of the plurality of workers' profiles and associated specific tracked worker skill proficiency data based on each of the workers' performance for each of the completed on the proficiency assessments.

21. The project analysis and recommendation system of claim 1, wherein the computer instructions further include instructions for the processor to perform the following tasks:

determine one or more devoid worker proficiencies for each worker profile representing a differential between one or more skills required for project completion and the tracked worker skill proficiency data;

generate a customized worker proficiency assessment representing the one or more devoid worker proficiencies;

present the customized proficiency assessment to an associated worker;

track the worker's performance on the customized worker proficiency assessment;

adjust the tracked worker skill proficiency data within the associated worker's worker profile based on the worker's performance on the customized worker proficiency assessment;

update the weighted worker match score; and update the worker recommendation.

22. A project analysis and recommendation system:

a user interface configured to receive user input regarding one or more project parameters related to a project, the one or more project parameters including at least information regarding one or more necessary competencies for project completion;

a non-transitory computer-readable medium containing one or more sets of computer instructions, a worker skill database containing a plurality of worker profiles having worker skill proficiency data, and a project parameter database; and a processor configured to implement the one or more sets of computer instructions from the non-transitory computer-readable medium, the computer instructions containing instructions for the processor to perform the following tasks:

automatically track a plurality of workers' interactions with each tool used in one or more workflows, and wherein the interactions include keystrokes and cursor movements;

update each worker's profile and worker skill proficiency data into a worker skill database based on the worker's tracked interactions associated with each tool used to complete the one or more workflows;

automatically track the plurality of workers' training history data;

update each worker's profile and worker skill proficiency data into the worker skill database based on the worker's tracked training history data;

analyze the worker skill database, wherein each worker profile contains worker skill proficiency data derived from a worker's trainings, assessments, and workflow completions;

determine one or more weighted worker match scores by comparing the one or more necessary competencies for project completion and the plurality of worker profiles having worker skill proficiency data; and determine and list one or more deficiencies of at least one of the plurality of worker profiles between worker skill proficiency and the one or more necessary competencies.

* * * * *